United States Patent [19]

Zwanenburg et al.

[11] 4,142,987

[45] Mar. 6, 1979

[54] LUMINESCENT MATERIAL DISPERSION

[75] Inventors: Dirk J. Zwanenburg, Eindhoven, Netherlands; Hans-Georg Junginger, Aachen, Fed. Rep. of Germany

[73] Assignee: U.S. Philips Corporation, New York, N.Y.

[21] Appl. No.: 802,938

[22] Filed: Jun. 2, 1977

[30] Foreign Application Priority Data

Jun. 19, 1976 [DE] Fed. Rep. of Germany ....... 2627614

[51] Int. Cl.² ...................... C09K 11/02; C09K 11/10
[52] U.S. Cl. ........................ 252/301.36; 252/301.16; 252/301.33
[58] Field of Search ...................... 252/301.16, 301.33, 252/301.36

[56] References Cited

U.S. PATENT DOCUMENTS

| | | | |
|---|---|---|---|
| 2,740,050 | 3/1956 | Schultz | 252/301.36 X |
| 3,037,938 | 6/1962 | Amans | 252/301.33 |
| 3,214,622 | 10/1965 | D'Errico et al. | 252/301.36 X |
| 4,024,084 | 5/1977 | Sittardt et al. | 252/62.1 L |

Primary Examiner—F.C. Edmundson
Attorney, Agent, or Firm—David R. Treacy; Norman N. Spain

[57] ABSTRACT

A proper adherance of the luminescent material particles to the surface of the photoconductor is obtained when vinyl pyridinealkyl methacrylates polymers of 1-6, 6-14 and 14-20 carbon atoms are used as non-ionic macromolecular compounds.

2 Claims, No Drawings

LUMINESCENT MATERIAL DISPERSION

The invention relates to a dispersion for applying electrophotographically luminescent materials on picture screens of color television tubes, which comprises next to the particles of luminescent material a non-polar dispersion agent, a non-ionic macromolecular compound which is soluble in the dispersion agent and a material which controls charging of the fixed particles.

It is known to coat picture screens of color television tubes electrophotographically (U.S. Pat. No. 3,475,169). Dispersions of the above-mentioned kind are used for this purpose (GB-PS 1318396).

U.K. Patent application 75/51,841 = U.S. Application Ser. No. 640,446 (allowed) and now U.S. Pat. No. 4,024,084 purposes to add as single charge-controlling material an aluminum (III) or a chromium-III-salt of the formula $Al(AN)_n(OH)_{3-n}$ or $Cr(An)_n(OH)_{3-n}$ to such dispersions, wherein n = 1, 2 or 3 and AN represents the acid radical of an anthranilic acid which is possibly substituted in the benzene nucleus, the amino groups of this anthranilic acid being acylated with a fatty acid comprising 6 to 20 carbon atoms. In the formula n is preferably 1 or 2. The acylated anthranilic acid may be substituted in the nucleus by halogen-, aryl-, alkyl-, aralkyl-, nitro-, further amino-, o-alkyl-, o-aryl-, o-aralkyl-, hydroxyl- and/or ester groups.

The amino group of the anthranilic acid which is also substituted may have been acylated with a stearoyl group, a lauroyl group of a oleoyl group. The dispersion contains the aluminum (III) or chromium (III) salts preferably in quantities of $10^{-3}$ to $10^{-1}$ g. per 100 g of solid material. As non-ionic macromolecular compound the dispersion contains preferably polymethacrylate, whose ester components comprise 6 and 20 carbon atoms, or mixed polymers of vinyl pyridine with methacrylates whose ester components comprise between 6 and 20 carbon atoms. With these polymers a satisfactory dispersion of the luminescent material in the dispersion agent, for example in aliphatic hydrocarbons is obtained.

A problem is, however, the adherance of the luminescent particles to the photoconductor during development.

A further problem is the adherance of the first luminescent material color pattern when the second luminescent material color is applied electrophotographically. In the first place the application of the luminescent material suspension for producing the second luminescent material colour pattern (for example by means of spraying) may produce mechanical forces acting on the luminescent material particles of the first luminescent material color pattern which may exceed the force of adhesion. If these mechanical forces exceed the forces of adhesion a color contamination is found, that is to say luminescent material particles of the color of the first luminescent material are present on the second luminescent material colour pattern. The same problems occur of course in the production of the third luminescent material colour pattern when the forces of adhesion for the first and/or second luminescent material are lower than the mechanical forces.

It is an object of the invention to provide a dispersion in which the luminescent material particles are present in a well-dispersed form and with which at the same time a satisfactory adherance of the luminescent material particles to the surface of the photoconductor is obtained.

This object is accomplished with a dispersion of the type mentioned in the preamble which comprises as non-ionic macromolecular compound.

(a) mixed polymers of vinyl pyridine and methacrylates; the methacrylates being esterified with alkyl groups having 6 to 18, preferably 10 to 14, carbon atoms.

(b) and mixed polymers of vinyl pyridines and methacrylates, wherein the methacrylates are partly esterified with alkyl groups having 1 to 6 carbon atoms, partly with alkyl groups having 14 to 20 carbon atoms.

During the investigations which resulted in the invention the following was found: to obtain a proper dispersion of the luminescent materials a mixed polymer having a given proportion of long alkyl ester chains (with twelve carbon atoms or more) is required. To obtain a proper adherance of the luminescent material particles the "aliphatic character" of the mixed polymers must not become too great. Consequently, a given proportion of short alkyl ester chains in the mixed polymer is advantageous. Furthermore, care must be taken that the mixed polymer remains soluble in aliphatic solvents (for example hydrocarbons). To obtain a proper adherance the use of polymethacrylates having different alkyl esters alone is not sufficient but it is also necessary to incorporate vinyl pyridine, for example 4-vinyl pyridine, 2-vinyl pyridine or 2-methyl-5-vinyl pyridine in the polymer.

If the dispersion according to the invention comprises mixed polymers of vinyl pyridines and methacrylates of different kinds it is useful to use mixed polymers of the following composition:

20 to 40 mole % vinyl pyridine of methacrylates which have been esterified with alkyl groups having 1 to 6 carbon atoms in an amount up to 40 mole % present, at least 25 mole % of methacrylates which have been esterified with alkyl groups having 6 to 14 carbon atoms and methacrylates which have been esterfied with alkyl groups having 14 to 20 carbon atoms present in amount up to 50 mole %.

Besides the above-mentioned anthranilates the following materials may be taken into consideration as control materials for the dispersion according to the invention: mixtures of alkyl salicylates with cetyl titanate, calcium alkyl salicylate, barium oliate, calcium diisopropyl salicylate, barium sulfonate and calcium dodecyl sulfonic succinate.

Isoparaffins having a boiling range from 160° to 210° C. are preferably used as apolar solvents.

The advantages of the dispersion according to the invention consist in that the proper dispersion of the luminescent material particles and the considerably improved adherance in the electrophotographic production of phosphor patterns for color picture screens enables an improved luminescent material pattern production and causes no color contamination of the first luminescent material color by the second luminescent material color, or of the first and second luminescent material color by the third luminescent material color.

The invention will be further explained with reference to the following embodiment.

EXAMPLE 1

4.5 l of aliphatic hydrocarbon (boiling range 160 to 210° C.), 45 ml of a mixed polymer of 2-methyl-5-vinyl pyridine with methyl-lauryl- and stearyl methacrylate (ratio 1:0.5:1.5:0.5) (20 g/l solvent), 30 ml of chromium- N-stearoyl anthranilate as control material (1g/1 of toluene), 360 g of activated ZnS (blue luminescent material) were mixed together. After ultrasonic dispersion for 4 minutes luminescent material stripes can be deposited electrophotographically by means of spraying with this dispersion.

What is claimed is:

1. In a dispersion for electrophotographically applying luminescent materials to picture screens for color television tubes comprising a dispersion in a non-polar dispersing agent of a non-ionic macromolecular compound soluble in said dispersion agent, a luminescent material and a material for controlling the change of said luminescent material the improvement wherein said non-ionic macromolecular compound comprises mixed polymers of vinyl pyridines and alkyl methacrylates wherein the alkyls are of 6–14 carbon atoms and mixed polymers of vinyl pyridines and methacrylates partially esterified with alkyls of 1 to 6 carbon atoms and partially with alkyls of 14 to 20 carbon atoms.

2. A dispersion as claimed in claim 1, characterized in that the mixed polymers have the following composition:

20 to 40 mole % vinyl pyridine, methacrylates which have been esterfied with alkyl groups having 1 to 6 carbon atoms present in an amount up to 40 mole %, at least 25 mole % methacrylates which have been esterified with alkyl groups having 6 to 14 carbon atoms, and methacrylates which have been esterified with alkyl groups having 14 to 20 carbon atoms present in an amount up to 50 mole %.

* * * * *